(12) United States Patent
Grocutt

(10) Patent No.: US 11,720,356 B2
(45) Date of Patent: Aug. 8, 2023

(54) RANGE CHECKING INSTRUCTION FOR SETTING A STATUS VALUE INDICATIVE OF WHETHER A FIRST ADDRESS AND SECOND ADDRESS IDENTIFIED BY THE INSTRUCTION CORRESPOND TO THE SAME MEMORY ATTRIBUTE ENTRY

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/271,373

(22) PCT Filed: Aug. 20, 2019

(86) PCT No.: PCT/GB2019/052336
§ 371 (c)(1),
(2) Date: Feb. 25, 2021

(87) PCT Pub. No.: WO2020/079386
PCT Pub. Date: Apr. 23, 2020

(65) Prior Publication Data
US 2021/0326134 A1  Oct. 21, 2021

(30) Foreign Application Priority Data
Oct. 18, 2018  (GB) ..................................... 1816957

(51) Int. Cl.
*G06F 9/30* (2018.01)
*G06F 9/355* (2018.01)

(52) U.S. Cl.
CPC ...... *G06F 9/30021* (2013.01); *G06F 9/30094* (2013.01); *G06F 9/355* (2013.01)

(58) Field of Classification Search
CPC .. G06F 9/355; G06F 9/30021; G06F 9/30094; G06F 9/3842
See application file for complete search history.

(56) References Cited

U.S. PATENT DOCUMENTS 5,889,983 A * 3/1999 Mittal ................... G06F 9/3834
712/E9.034
6,009,512 A * 12/1999 Christie ................ G06F 9/3842
712/E9.05

(Continued)

FOREIGN PATENT DOCUMENTS

| GB | 1 521 959 | 8/1978 | |
| GB | 2522906 | 8/2015 | |
| GB | 2543302 A | * 4/2017 | .............. G06F 11/07 |

OTHER PUBLICATIONS

M. Lv, Q. Deng, N. Guan, Y. Xie and G. Yu, "ARMISS: An Instruction Set Simulator for the ARM Architecture," 2008 International Conference on Embedded Software and Systems, pp. 548-555 (Year: 2008).*

(Continued)

*Primary Examiner* — Andrew Caldwell
*Assistant Examiner* — Kasim Alli
(74) *Attorney, Agent, or Firm* — Nixon & Vanderhye P.C.

(57) ABSTRACT

An apparatus comprises an instruction decoder to decode instructions, processing circuitry to perform data processing in response to the instructions decoded by the instruction decoder, and memory attribute checking circuitry to check whether a memory access request issued by the processing circuitry satisfies access permissions specified in a plurality of memory attribute entries. Each memory attribute entry specifies access permissions for a corresponding address region of variable size within an address space. In response to a range checking instruction specifying address identifying parameters for identifying a first address and a second (Continued)

address, the instruction decoder controls the processing circuitry to set, in at least one software-accessible storage location, a status value indicative of whether the first address and the second address correspond to the same memory attribute entry.

21 Claims, 7 Drawing Sheets

(56) References Cited

U.S. PATENT DOCUMENTS

| | | | | |
|---|---|---|---|---|
| 6,343,375 | B1* | 1/2002 | Gupta | G06F 9/44589 |
| | | | | 717/152 |
| 6,516,395 | B1 | 2/2003 | Christie | |
| 7,932,912 | B1* | 4/2011 | Van Dyke | G06T 1/60 |
| | | | | 345/568 |
| 2015/0227462 | A1 | 8/2015 | Grocutt | |

OTHER PUBLICATIONS

"Complex instruction set computer" <https://en.wikipedia.org/w/index.php?title=Complex_instruction_set_computer&oldid=753638008>, pp. 1-5 (Year: 2016).*

International Search Report and Written Opinion of the ISA for PCT/GB2019/052336, dated Dec. 2, 2019, 14 pages.

Search Report for GB1816957.3, dated Apr. 23, 2019, 4 pages.

Robert Bedichek, "Some Efficient Architecture Simulation Techniques," Proceedings of the Winter 1990 USENIX Conference, Jan. 22-26, 1990, 12 pages.

Arm Compiler version 6.6, "Armclang Reference Guide", Nov. 4, 2016, 174 pages.

Office Action for IN Application No. 202117014396 dated Jan. 6, 2023, 6 pages.

Office Action for IL Application No. 280711 dated Mar. 29, 2023, 5 pages.

* cited by examiner

|   | LS | S |
|---|---|---|
| T | less secure thread (privileged or unprivileged) | secure thread (privileged or unprivileged) |
| H | less secure handler (privileged) | secure handler (privileged) |

TT Rd, [ #add1, #add2 ]

TT Rd, [ Rn, Rm {,LSL #imm} ]

check access against:

| instruction variants | current security domain | different security domain (LS) |
|---|---|---|
| current mode | 1st (TT) | 2nd (TTA) (fault if executed in LS domain) |
| force unprivileged | 3rd (TTT) (fault if executed in unprivileged state) | 4th (TTAT) (fault if executed in unprivileged state and/or LS domain) |

RANGE CHECKING INSTRUCTION FOR SETTING A STATUS VALUE INDICATIVE OF WHETHER A FIRST ADDRESS AND SECOND ADDRESS IDENTIFIED BY THE INSTRUCTION CORRESPOND TO THE SAME MEMORY ATTRIBUTE ENTRY

This application is the U.S. national phase of International Application No. PCT/GB2019/052336 filed 20 Aug. 2019, which designated the U.S. and claims priority to GB Patent Application No. 1816957.3 filed 18 Oct. 2018, the entire contents of each of which are hereby incorporated by reference.

The present technique relates to the field of data processing.

A data processing apparatus may have memory attribute checking circuitry for checking whether a memory access request satisfies access permissions specified in one of a number of memory attribute entries. For example, the access permissions may specify properties of corresponding regions of an address space, such as whether the regions are restricted to read-only access or can be both read and written, or specifying which modes of operation of the processing circuitry are able to access the region. This can be useful for enforcing security constraints on accessing certain data within the memory system.

At least some examples provide an apparatus comprising: an instruction decoder to decode instructions; processing circuitry to perform data processing in response to the instructions decoded by the instruction decoder; and memory attribute checking circuitry to check whether a memory access request issued by the processing circuitry satisfies access permissions specified in a plurality of memory attribute entries, each memory attribute entry specifying access permissions for a corresponding address region of variable size within an address space; in which: in response to a range checking instruction specifying address identifying parameters for identifying a first address and a second address, the instruction decoder is configured to control the processing circuitry to set, in at least one software-accessible storage location accessible to at least one type of instruction supported by the instruction decoder, a status value indicative of whether the first address and the second address correspond to the same memory attribute entry.

At least some examples provide a data processing method comprising: decoding, using an instruction decoder, a range checking instruction specifying address identifying parameters for identifying a first address and a second address; and in response to decoding the range checking instruction, controlling processing circuitry to set, in at least one software-accessible storage location accessible to at least one type of instruction supported by the instruction decoder, a status value indicative of whether the first address and the second address correspond to the same memory attribute entry of a plurality of memory attribute entries, each memory attribute entry specifying access permissions for a corresponding address region of variable size within an address space.

At least some examples provide a computer program for controlling a host data processing apparatus to provide an instruction execution environment for execution of instructions of target code; the computer program comprising: instruction decoding program logic to decode instructions of the target code and control the host data processing apparatus to perform data processing in response to the decoded instructions; and memory attribute checking program logic to check whether a memory access request triggered by the decoded instructions of the target code satisfies access permissions specified in a plurality of memory attribute entries, each memory attribute entry specifying access permissions for a corresponding address region of variable size within a simulated address space simulated by the instruction execution environment; in which: in response to a range checking instruction specifying address identifying parameters for identifying a first address and a second address, the instruction decoding program logic is configured to control the host data processing apparatus to set, in at least one software-accessible storage location accessible to at least one type of instruction supported for decoding by the instruction decoding program logic, a status value indicative of whether the first address and the second address correspond to the same memory attribute entry.

At least some examples provide a computer-readable storage medium storing the computer program described above. The storage medium may be non-transitory storage medium.

Further aspects, features and advantages of the present technique will be apparent from the following description of examples, which is to be read in conjunction with the accompanying drawings, in which.

Figure 1:
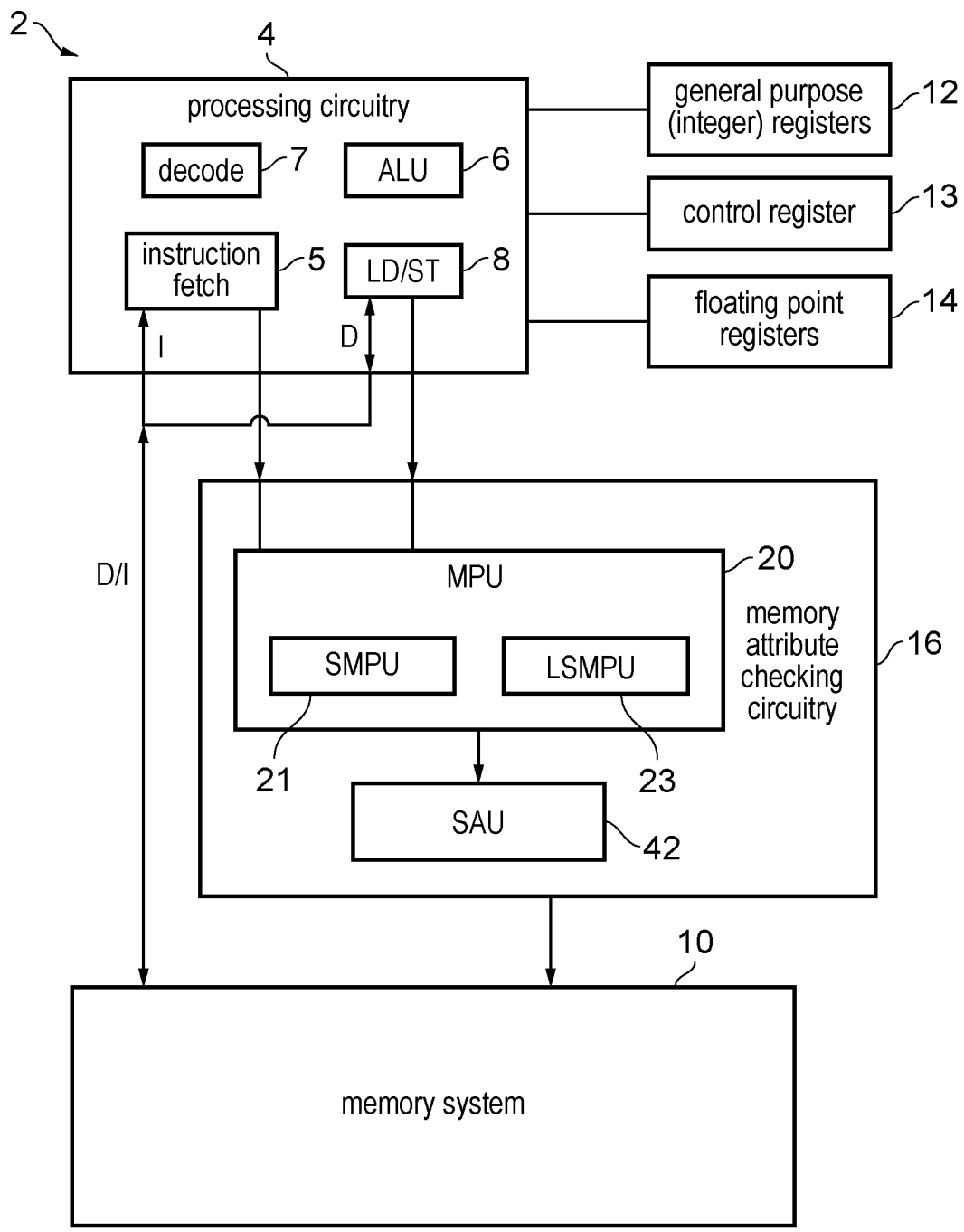
FIG. 1 illustrates an example of a data processing apparatus having memory attribute checking circuitry.

An apparatus has an instruction decoder to decode instructions and processing circuitry to perform data processing in response to the instructions decoded by the instruction decoder. Memory attribute checking circuitry is provided to check whether a memory access request issued by the processing circuitry satisfies access permissions specified in two or more memory attribute entries. Each memory attribute entry may specify access permissions for a corresponding address region of variable size within an address space. Hence, since each memory attribute entry may correspond to a variable size address region, it is not predetermined which addresses map to a particular memory attribute entry. Support for variable size entries can be useful for allowing a relatively large address region to be covered in a single memory attribute entry, thus reducing the number of memory attribute entries required.

The instruction decoder of the apparatus supports decoding of a range checking instruction which specifies address identifying parameters for identifying a first address and a second address. In response, the instruction decoder controls the processing circuitry to set, in at least one software-accessible storage location accessible to at least one type of instruction supported by the instruction decoder, a status value which is indicative of whether the first address or second address correspond to the same memory attribute entry. Hence, this instruction allows the software to gain insight into whether a first and a second address both correspond to the same memory attribute entry or correspond to different memory attribute entries. Such an operation may be considered relatively unusual, since typically when memory attribute data is checked for a memory access specifying a given target address, the only information that is visible to software based on the memory attribute checking is an indication of whether the memory access was successfully carried out or whether it triggered a fault because the access permissions were not specified. Which particular memory attribute entry a given address corresponds to is typically not regarded of interest.

However, it is recognised that information on whether first and second addresses correspond to the same memory attribute entry may be useful for certain security checking operations, for example to allow software process to check whether every word in an array bounded by the first and second addresses is accessible to a particular software process. By providing the range checking instruction, which can make accessible to software an indication of whether both the first and second addresses correspond to the same memory attribute entry, this can simplify such security checking. If the addresses do correspond to the same memory attribute entry, then if that memory attribute entry indicates that the corresponding region of the address space is accessible to the relevant software, then this may imply that all addresses between the first and second addresses are accessible, without needing to individually check each address, which can greatly improve the speed of performing the permission checking. Another reason why it might be useful to check whether the first and second addresses correspond to the same memory attribute entry may be for systems performing certain real-time critical tasks where it is important for the task to be performed with a deterministic latency, since if it can be known in advance that a certain range of addresses bounded by the first and second addresses all correspond to the same memory attribute entry, then it can be expected that there will be no faults triggered part way through processing the range of addresses due to crossing into a different address region for which no memory attribute entry has yet been defined.

An alternative way of checking whether two addresses correspond to the same memory attribute entry would be to provide in the instruction set architecture an instruction which specifies a single address, for which execution of the instruction causes an indication of the entry number of the particular memory attribute entry which matches that address to be returned to a software-accessible storage location. However, the range checking instruction which specifies first and second addresses as discussed above has a number of advantages. For example, since the instruction may simply return a status value indicating whether the first and second addresses correspond to the same memory attribute entry, rather than a region number identifying the specific entry matching a given address, this means that the storage capacity required to store the result of the instruction scales much better with systems which support an extremely large number of different memory attribute entries, since for example a status value could be as small as a single bit regardless of the number of memory attribute entries provided, rather than needing a multi-bit value with a size increasing depending on the total number of entries.

Also, the range checking instruction specifying the first and second address can provide the information on whether the first and second addresses correspond to the same memory attribute entry in a single instruction, rather than requiring two separate instructions to query the entry number associated with both the first address and the second address. Providing a range checking instruction also avoids the need for a comparison instruction to compare the entry numbers returned by the two separate region number query instructions. A lookup process to lookup the set of memory attribute entries to check which entry corresponds to a given address may take a certain amount of time. Although such security checking operations to check whether addresses correspond to the same memory attribute entry may account for a relatively small proportion of overall execution time of a program, they are nevertheless on the critical path of some latency sensitive tasks, so the reduction in workload in enabling the relevant checks to be performed with fewer instructions can be beneficial especially for certain realtime critical applications. In some applications permissions checking may have to be performed in a large number of functions within the software. Providing a single range checking instruction can be important in reducing code size in constrained environments.

The range checking instruction described can be particularly useful for systems where the memory attribute checking circuitry permits a variable size of the corresponding address region for a given memory attribute entry to be a number of bytes other than a power of 2. This may, for example, contrast with hierarchical page tables where each page table entry may correspond to a page of a fixed power of 2 number of bytes, for which different portions of the address may index into the particular page table entry required, in some cases through a series of multi-level lookups in a page table walk operation. In such a hierarchical page table it is relatively unlikely that an array of data may entirely fall within one page table entry. In contrast, with a memory attribute checking approach where a single entry may correspond to a non-power of 2 number of bytes, this may allow an arbitrarily sized address region to be defined in a single entry, for example using information specifying the start and end addresses of the address region (e.g. using explicitly identified boundary addresses or using a base address and a size). Hence, with the approach supporting variable region sizes of sizes other than a power of 2 number of bytes, it is more likely that the user of the system will tend to define their address regions so that certain arrays of data fall entirely within a single region, and so the range checking instruction discussed above can be particularly useful for such a system permitting non-power of 2 bytes-sized regions.

Similarly, the processing circuitry may permit a difference between the first address and second address identified by the range checking instruction to be a number of bytes other than a power of 2.

The first and second addresses could be identified in a number of different ways by the range checking instruction. In one example the address identifying parameters could specify a base address of the first address and specify an offset for identifying a difference between the first address and the second address. The base address and offset could be specified in registers identified by the range checking instruction. Alternatively, the base address could be specified in a register, but the offset could be specified as an immediate value.

In another example, the offset may be specified as a multiple and a size value, which when multiplied together give the offset. One of the multiple and the size value could be a variable parameter specified by the range checking instruction, with the variable parameter for example identified by an immediate value, or by a value stored in a register specified by the range checking instruction. On the other hand, the other of the multiple and the size value could be specified as any one of a fixed value, an immediate value specified by the range checking instruction, or a value stored in a register specified by the range checking instruction.

In general, specifying the first address through a base address and the second address using an offset to be added to the base address can be useful, because it means there is no ambiguity as to which address is the lower address and the upper address, which can make performing the queries for determining whether the first and second addresses map onto the same memory attribute entry simpler to implement. Specifying the offset as the product of a multiple and a size value can be useful because in some cases the software executing instruction may find it more convenient to specify the size of an array in terms of a number of elements of some given size, rather than in terms of the total offset in the address space. Hence, a multiple and/or a size specifying variant of instruction can be useful to make programming or compiling of code simpler. This may also improve the performance and size of the resulting executable.

Alternatively, another way of identifying the address identifying parameters could be to specify a first register from which first address is to be read and a second address from which the second address is to be read. Hence in this case both the first and second addresses may explicitly be specified by the code by writing them to the first and the second registers prior to executing the range checking instruction.

Similarly, different architectures may provide different options for which storage location is the software-accessible storage location to which the status value is written in response to the range checking instruction. In some cases the software-accessible storage location could be a storage location stored in memory. However it can be useful for implementations to provide that the software-accessible storage is a register, as this can make subsequent reads of the status value faster, which can speed up the security checking operations of the type discussed above.

Hence, in one example the at least one software-accessible storage location may comprise a destination register specified by the range checking instruction. For example the destination register may be specified as any one of a number of general purpose registers of the processing circuitry. The selected destination register can then be used as a source register of a subsequent instruction for carrying out an action conditional on whether the first and second addresses correspond to the same memory attribute entry.

Alternatively, or in addition to writing the status value to the destination register, another approach is to set the status value by updating at least one condition status indication in a control register. For example the control register may store at least one condition status indication indicative of a property of a result of a previous condition status indicator producing instruction. For example, some instructions may trigger setting of condition status flags which may indicate properties such as whether a processing result is zero, a processing result is negative or whether a signed or unsigned overflow occurred. The instruction decoder may support at least one conditional instruction which triggers the processing circuitry to perform a conditional operation conditional on whether the at least one condition status indication stored in the control register satisfies a test condition. Hence, some instructions may directly access the condition status indications in order to trigger some action to be performed conditional on results of previous instructions. Hence, by using the condition status indications to provide the status value which indicates information dependent on whether the first and second addresses map to the same memory attribute entry, this can allow a subsequent instruction to perform a conditional operation directly in a single instruction, as opposed to needing an intervening instruction to compare a value placed in a general purpose register before then having a subsequent conditional instruction dependent on the condition resulting from the compare instruction. This can allow the security checking operations to be performed faster.

In some examples of the range checking instruction, the instruction may update only a destination register but not any condition status indication, or vice versa with only a condition status indication being set but no value in a general purpose destination register. Other variants may update both types of register so that subsequent conditional instructions can directly test the condition codes in the control register to determine whether the previous range checking instruction found that the first and second addresses map to the same memory attributes entry, but other information could also be derivable from the destination register of the range checking instruction.

In response to the range checking instruction, at least when the first and second addresses both map to the same memory attribute entry, it can be useful for the processing circuitry to store to the at least one software-accessible storage location attribute information derived from a matching memory attribute entry corresponding to the first and second addresses. For example, the attribute information could indicate whether an access to the address region corresponding to the matching memory attribute entry would be allowed in a given mode of operation of the processing circuitry. Such attribute information, in addition to (or combined with) the indication of whether the first and second addresses map to the same memory attribute entry can allow some forms of security checks to be performed using a single instruction.

In one example, the attribute information could be recorded as an additional field separate from the status value indicating whether the first and second addresses map to the same memory attribute entry.

In other examples, the indication of the attribute information could be combined with the status value indicating whether the first and second addresses map to the same memory attribute entry. For example, a single status indicator may be set to a first value when both the following conditions are satisfied (i) both first and second addresses map to the same memory attribute entry, and (ii) the matching memory attribute entry specifies that a memory access to the corresponding address region defined by that entry would be permitted, and if either of these conditions are not satisfied then the status indicator could be set to a second value. Hence, in such an embodiment, the same status indicator may function as both the status value and the attribute information.

In one example the processing circuitry may have a number of different operating states in which it can operate, e.g. different modes, domains or privilege levels. In response to at least one variant of the range checking instruction, the processing circuitry may derive the attribute information to be written to the software-accessible storage location based on access permissions that would be imposed on memory accesses to the corresponding address region for the matching memory attribute entry when in a different operating state to the current operating state of the processing circuitry. Hence, rather than checking whether accesses would be permitted in the current operating state, the instruction instead gives an indication of whether accesses would have been permitted if the system was in a different operating state. Such variants of the range checking instruction which permit a cross-operating state check can be particularly useful for guarding against security attacks based on the confused deputy problem where an attacker having untrusted software may attempt to trick trusted software into performing an inappropriate operation by passing it a pointer to an array which is out of bounds for example. The cross-operating state variant of the range checking instruction can therefore be used by the trusted code to check whether the value passed to it by untrusted code is valid, e.g. by checking whether the addresses calculated based on that value map to the same memory attribute entry and whether the attribute information derived for the attacker's operating state would indicate that the access would be permitted.

In one particular example, the processing circuitry may have a number of domains of operation including a secure domain and a less secure domain, and within each security domain the processing circuitry may operate in one of a number of modes and in one of a number of privilege levels. Some modes may be associated with operation in a particular privilege level. Other modes may support operation at two or more different privilege levels depending on a current privilege level indicator which could be stored in a particular control register. To allow for a number of different types of security checking operation, it can be useful for the instruction decoder to support at least one of the following variants of the range checking instruction: a first variant for which the attribute information specifies whether a memory access to an address in a range between the first address and the second address would be permitted when the processing circuitry is in a current security domain, and a privilege level associated with the current mode; a second variant for which the attribute information specifies whether a memory access to an address in the range between the first address and the second address would be permitted when the processing circuitry is in a different security domain to the current domain, and the privilege level associated with the current mode when operating in the different security domain; a third variant for which the attribute information specifies whether a memory access to an address in the range between the first address and the second address would be permitted in a current security domain, and a different privilege level to the privilege level associated with the current mode; and a fourth variant for which the attribute information specifies whether a memory access to an address in the range between the first address and the second address would be permitted when the processing circuitry is in a different security domain to the current domain, and a different privilege level to the privilege level associated with the current mode. To provide flexibility of choice for the programmer or compiler, at least two of the first to fourth variants may be supported by the instruction decoder in some embodiments.

Hence, the first variant allows for security checking based on attributes associated with the current domain and mode.

The second and fourth variants permits a cross-domain check to check whether a different security domain to the current domain would be allowed to access the address range between the first and second addresses. For example, some systems may support maintaining different sets of memory attribute entries for the secure and less secure domains respectively, and so for the second and fourth variants of the range checking instruction, the checks performed to derive the attribute information may be based on a different set of memory attribute entries to the one used for the current domain. When the instruction decoder supports at least one of the second variant and fourth variant of the range checking instruction, then it can be useful for the different security domain to comprise the less secure domain. To prevent the less secure domain probing the security permissions, the processing circuitry may trigger signalling of a fault if there is an attempt to execute one of the second and fourth variants of the instruction when operating in the less secure domain. Hence, these variants may allow a more secure domain to check whether accesses to addresses between the first address and the second address would have been permitted for a less secure domain, which can be useful for avoiding confused deputy attacks.

Similarly, for the third and fourth variants, the attribute information may be based on whether a memory access to an address in the range between the first and second addresses would be permitted in a different privilege level to the current privilege level of the processing circuitry. Again, this type of variant can be particularly useful if the different privilege level is a less privileged privilege level than the current privilege level. In this case, a fault may be triggered if there is an attempt to execute one of the third and fourth variants of the range checking instruction when the processing circuitry is in at least one predetermined privilege level, for which there is at least one more privileged privilege level than the at least one predetermined privilege level. These variants of the instruction can be useful for allowing the more privileged code to check whether values passed to it by less privileged code can be trusted.

It will be appreciated that it is not essential for all four variants to be supported by a given implementation of the processing system.

In some examples the memory attribute checking circuitry may check for a given memory access request whether the memory access request satisfies both access permissions specified in a first set of memory attribute entries and access permissions specified in a second set of memory attribute entries. For example there may be a number of different types of memory attribute entry associated with different functions, e.g. a first set of entries providing memory protection information (such as defining read-only or readable and writeable regions or specifying which privilege levels can access the corresponding address regions) and a second set of memory attribute entries which may specify which of the security domains is associated with a given address region.

Hence in some examples in response to the range checking instruction the instruction decoder may control the processing circuitry to set, in the at least one software-accessible storage location, both a first status value indicative of whether the first address and the second address correspond to the same entry of the first set of memory attribute entries, and a second status value indicative of whether the first and second addresses correspond to the same entry of the second set of memory attribute entries. Hence, in a single instruction both sets of memory attribute entries can be looked up, and indications of whether an entire range of addresses maps to the same entry in both sets of memory attribute entries can be returned.

As mentioned above, one of the sets of memory attribute entries may be a set of memory protection entries. The range checking instruction discussed above can be particularly useful in implementations where the memory access requests target a given memory system and the memory protection entries used to control access to the memory system are provided in a memory protection table which itself is stored in the memory system. This approach is relatively unusual, but allows a memory protection table with a relatively large number of memory protection entries to be supported without greatly increasing the hardware costs of storing and managing such a larger number of entries. In systems where the memory protection table is stored in the memory system so that the number of memory protection entries supported can be increased, the range checking instruction of the type discussed above can be particularly useful because the alternative of providing an instruction which returns which particular entry number is associated with a given address may be harder to scale with the increasing size of the memory protection table, especially in implementations where the instruction is intended to return information on the address mapping in a number of different sets of memory attribute entries as discussed above. Also, in a system where the memory protection entries are stored in the memory system, it can be useful to provide memory protection cache storage circuitry to cache at least one memory protection entry of the memory protection table obtained from the memory system. If the alternative instruction which returns an entry number of the memory protection entry mapping onto a given address was used, such an instruction would imply that the cache storage would need to cache the entry number associated with each cache entry so that the instruction for querying the entry number associated with a given address could quickly access the entry number associated with a cached memory protection entry without needing to search the memory protection table within the memory system. In contrast, with the range checking instruction discussed above, such caching of entry numbers is not necessary since whether the first or second addresses map onto the same entry can be determined without needing to cache the entry numbers themselves. This can be particularly useful because the entries in the memory protection cache storage circuitry may be implemented as register-based storage, and so by eliminating the need to cache the entry number, this can save a significant number of bits in each cached entry which can provide a significant circuit area reduction.

In systems which use a memory-based memory protection table, it is also possible to provide some configuration registers in hardware to store at least a subset of the memory protection entries, in addition to the memory protection table stored in memory. Some statically configured registers which do not act as a cache (but instead are assigned to providing fixed memory protection entries defining certain properties for frequently used regions of the address space) can be useful for improving performance. Hence in some cases the range checking instruction may also query some memory protection entries stored in such configuration registers.

Alternatively, the range checking instruction could be supported in a system which does not store any memory protection entries in the memory system itself, but where the entire set of memory protection entries is implemented using configuration registers.

Another example of a set of memory attribute entries may be security attribute entries which specify access permissions indicating which of a number of security domains are associated with the corresponding address region. These may be implemented in addition to the memory protection entries discussed above. For example, checking of the security domain associated with a given address region can be useful for checking which security domain the processing circuitry should operate in when executing code from a given address region. Also the security attribute entries may be checked when a memory access request is issued from a given security domain. For example, memory address regions associated with a less secure domain may be accessible in the secure domain, while regions associated with a secure domain may be accessible in the secure domain but may be inaccessible when in the less secure domain.

In response to at least one variant of the range check instruction, at least when the first and second addresses both correspond to the same security attribute entry, the attribute information provided in at least one software-accessible storage location may be derived from the security domain specified as associated with a corresponding address region by the matching security attribute entry which corresponds to the first and second addresses.

As discussed above, in some systems the memory attribute checking circuitry may support both the memory protection entries discussed above and the security attribute entries. In this case it can be useful for at least one variant of the range checking instruction to derive information from a combination of a matching memory attribute entry corresponding to the first and second addresses and a matching security attribute entry corresponding to the first and second addresses. For example, in response to this variant of the range checking instruction, the instruction decoder may store to the at least one software-accessible storage location at least one combined permission indicator which specifies in a single indicator whether access permissions in the matching memory protection entry and access permissions in the matching security attribute entry both specify that a given type of memory access is permitted. For example, this combined permission indication could be stored to the condition status indication in the control register as discussed above so that a subsequent conditional instruction can directly test the combined indicator to determine whether a subsequent operation can proceed.

One might expect that checking in a single instruction whether both a first address and a second address map to the same memory attribute entry could be relatively slow to perform, in particular if memory address regions can have an arbitrary non-power of 2 size as discussed above. However, in practice the inventor recognised that the range checking operation to return the status information identifying whether the first and second addresses map to the same memory attribute entry can in fact be performed with a similar latency to the lookup operation performed to identify the memory attribute entry corresponding to a single address. In practice, the memory attribute checking circuitry may have at least one set of comparators, where each set of comparators includes a lower bound comparator for comparing a target address of the memory access request against a lower bound address of a given memory attribute entry, and an upper bound comparator to compare the target address of a memory access request against an upper bound address of the given memory attribute entry. For a regular memory access request, the given memory attribute entry may be identified as matching the target address of the memory access request if both the lower bound comparator and the upper bound comparator provide a positive result. For example a lower bound comparator may determine whether the target address is greater than or equal to the lower bound address and the upper bound comparator may determine whether the target address is less than or equal to the upper bound address.

One might expect that for the range checking instruction both of the first address and the second address would have to be supplied sequentially as target addresses to each set of comparators in two separate lookups. However, the inventor recognised that in response to the range checking instruction the instruction decoder can control the processing circuitry to supply the first address as the target address to the lower bound comparator of each set of comparators, and in parallel to supply the second address to the upper bound comparator of each set of comparators. Hence, while for a regular memory access the two comparators in each set would typically be expected to compare the same address against the lower and upper bound addresses respectively, for the range checking instruction these can be adapted to receive different inputs so that the comparisons based on the first and second addresses can be performed in parallel. If any of the sets of comparators returns that both the lower bound comparator and the upper bound comparator in the same set of comparators identify a positive result of the comparison, then a hit signal may be generated to indicate that the first and second addresses map to the same entry. Hence, other than the logic for supplying the first and second addresses to the lower and upper bound comparators instead of supplying a target address to both comparators, the remaining logic for looking up the memory attribute entries may be the same as would typically already be provided for handling lookups for regular memory access operations, and so the range checking instruction can in practice be supported with relatively little additional area overhead. This means that the range checking instruction of the type discussed above can have a significant performance improvement over alternatives where two separate instructions individually check which memory attribute entry is mapped to a single address.

The lookup approach where the lower and upper bound comparators compare the first and second addresses respectively may require prior knowledge as to which of the first and second addresses is the lower address, so that the lower address can be supplied to the lower bound comparator and the upper address can be supplied to the upper bound comparator.

Different architecture implementations may use different approaches for ensuring that the first address is always lower than the second address. In some examples the encoding of the range checking instruction itself may constrain the first address to be lower than the second address. For example the variants of the instructions discussed above, for which the second address is specified as an offset to be added to the first address, may by definition ensure that the second address is higher than the first address. In this case then there is no need to provide a full comparison of the first address and the second address to check which is lower. In general, it may be assumed that the second address is higher than the first addresses, unless the addition of the offset to the first address causes an overflow or wraparound. For example, if the first address is relatively high in the allowable address range, adding the offset could cause the second address to wrap round a relatively low address in the address range. For additions which cause such a wraparound, it is possible either to signal a fault, or to simply return the status value with a value which indicates that the first and second addresses do not correspond to the same memory attribute entry.

Alternatively, other approaches may allow an unconstrained specification of the first and second addresses, for example the variant discussed above where both addresses are specified in respective registers so that there could be a chance that the second address is lower than the first address. In this case, one approach could be to provide logic for comparing the first and second addresses and then determining which is lower and supplying the lower of the first and second addresses to the lower bound comparators of each set and the other address to the upper bound comparator (this logic could also optionally be provided for the variant with the constrained specification of the first and second addresses, although it is not essential). However, in practice this logic may not be justified in terms of circuit area and instead some architectures may simply define that the result of the instruction may be unpredictable if the instruction is defined with the second address lower than the first address.

Hence, to ensure security by preventing any execution of the instruction when the second address is lower than the first address, some implementations may trigger signalling of a fault if there is an attempt to execute a range checking instruction for which the second address is lower than the first address. Alternatively (or in addition to signalling the fault), if the range checking instruction is attempted to be executed with the second address lower than the first address, then the processing circuitry could return the status value indicating that the first address and second address do not correspond to the same memory attribute entry (regardless of whether any hit signals are generated by any comparison logic for looking up the memory attribute entries).

A corresponding computer program may be provided for controlling a host data processing apparatus to provide an instruction execution environment for execution of instructions. The computer program may comprise instruction decoding program logic and memory attribute checking program logic which corresponds in functionality to the instruction decoder and memory attribute checking circuitry discussed above. Hence, range checking instructions in the program being executed within the instruction execution environment simulated by the computer program may be handled in an analogous way to range checking instructions in a program being executed on hardware which actually comprises the instruction decoder and memory attribute checking circuitry discussed above. The simulator computer program may present, to software executing on the simulator computer program, a similar instruction environment to that which would be provided by an actual hardware apparatus, even though there may not be any actual hardware providing these features in the host computer which is executing the simulator computer program. The functionality of the hardware architecture discussed above may be emulated by providing program logic, such as sets of instructions or data structures, which enables a generic host computer to execute code intended for execution on an apparatus with the memory attribute checking support discussed above, in a manner compatible with the results that would be achieved on an apparatus which actually has such hardware. The simulator computer program for controlling the host data processing apparatus may be stored on a storage medium. This storage medium may be a non-transitory storage medium.

FIG. 1 schematically illustrates a data processing system 2 having processing circuitry 4 for performing data processing in response to instructions. For example the processing circuitry 4 may be a CPU, DSP, GPU or other processing element of a data processing system. The processing circuitry 4 may include an instruction fetch unit 5 for fetching instructions from memory system 10 for processing by the processing circuitry, and an instruction decoder 7 for decoding the fetched instructions to generate control signals for controlling execution units 6, 8 to perform data processing operations in response to the decoded instructions. For example the execution units may include an arithmetic/logic unit (ALU) 6 for performing arithmetic or logical operations on operands fetched from registers 12, 14 to generate a result value which may be written back to the registers. The execution units could also include a load/store unit 8 for performing load/store operations for transferring data between the registers 12, 14 and the memory system 10. The registers may include a number of different types of registers including general purpose (integer) registers 12 for storing integer values for processing by the processing circuitry 4, and floating point registers 14 for storing values represented using floating-point representation. The registers accessible to the processing circuitry 4 could also include other types of register not shown in FIG. 1 for conciseness, such as vector registers for storing vector operands comprising multiple independent data elements and/or control registers 13 for storing various control parameters for controlling the operation of the processing circuitry 4, such as condition flags which can be checked by conditional instructions to determine whether to perform a conditional operation, a program counter storing an address representing a current point of execution, and control registers for controlling exception handling for example.

The memory system 10 may include one or more levels of caches as well as main memory. The memory system 10 is accessible by the processing circuitry 4 by executing a load instruction which triggers the load/store unit 8 to issue a memory access request for loading data from the memory system 10 into the registers 12, 14, or a store instruction for triggering the load/store unit 8 to issue a memory access request for storing data from the registers 12, 14 into the memory system 10. Also, the instruction fetch unit 5 issues memory access requests to fetch instructions from the memory system 10. Each memory access request may specify a target address of the location to be accessed. In this example the target address is a physical address directly specifying the location to be accessed, so no address translation is required.

A memory protection unit (MPU) 20 is provided for checking based on the target address whether the memory access request is permitted to be serviced by the memory system 10. The MPU 20 may store, or have access to, a number of memory protection entries which define access permissions for corresponding address regions of an address space. For example the access permissions may specify whether a given region of the address space is a read only region, or can be both read and written to, and/or can define which privilege levels of the processing circuitry 4 are allowed to access the corresponding address region. As shown in FIG. 1, the MPU 20 may in some examples comprise two separate MPUs, a secure MPU 21 and a less secure MPU 23 which correspond to secure and less secure domains respectively. When the processing circuitry 4 is operating in the secure domain then the secure MPU 21 may be accessed, while in a less secure domain the less secure MPU 23 may be accessed.

In addition to the MPU 20, the memory attribute checking circuitry 16 may also include a security attribute unit (SAU) 42 which comprises memory security configuration registers storing security protection entries which define secure and less secure regions in the address space. The target address of the memory access request is checked by the SAU 42 against region defining data of the security protection entries and the processing circuitry 4 may be restricted to accessing the secure regions of the address space only when operating in a secure domain of operation (the less secure regions of the address space may be accessible either in the secure domain or in a less secure domain). The access permissions defined by the security protection entries of the SAU 42 may apply permissions which are orthogonal to the permissions defined by the MPU 20 in the memory protection entries. That is, an access that would be permitted by the MPU 20 may nevertheless be rejected by the SAU 42, or vice versa. Both memory access requests initiated by the instruction fetch unit 5 and memory access requests initiated by the load/store unit 8 may be subject to checking by the MPU 20 and the SAU 42. While the MPU 20 and SAU 42 are shown in FIG. 1 as operating sequentially, some implementations could provide parallel lookups to the MPU 20 and SAU 42 for memory accesses issued by the processing security, to improve performance.

The MPU 20 checks whether memory access requests issued by the processing circuitry satisfy access permissions specified in a number of memory protection entries. Each memory protection entry may correspond to a particular address region of variable size within the address space. The corresponding address region for a given memory protection entry can be bounded by start and end addresses which are identified through parameters of the given memory protection entry. Unlike for the page tables used by a memory management unit (MMU), for an MPU the region corresponding to a memory protection entry may have a variable size which may be permitted to be a number of bytes other than a power of two. With this approach, it can be guaranteed that a memory address region of an arbitrary (non power of 2) size can be defined using a single memory protection entry, to avoid the risk of page walks and page faults occurring each time address accesses cross a page address boundary. This makes an MPU more suitable for systems designed for processing real time applications. Also, the MPU may store memory protection entries within registers provided locally within the MPU, which can be fast to access, again assisting with real time processing and avoiding the need for storing large page tables having a hierarchical structure within the memory system, which can be important for systems with limited RAM.

In one example, the memory protection entries for the MPU 20 may be specified using registers which may be directly connected to a parallel bank of comparators when comparing the target address to be accessed with the region identifying parameters of each memory protection entry stored in the registers. This approach can be suitable for systems where only a limited number of memory protection entries need to be defined, for example 8 or 16. In systems having separate secure and less secure MPUs 21, 23 then separate sets of registers may be provided for defining the secure memory protection entries and less secure memory protection entries respectively, with the relevant set of entries for the current domain of operation being selected when looking up the MPU 20.

However, with MPUs where all the memory protection entries are stored in registers, the power and area associated with the MPU may scale badly if the number of memory protection entries to be supported by the MPU increases. For systems which require a greater number of memory protection entries (e.g. because the limited number of memory protection entries in a register based MPU may cause a severe impact on performance, or the protection that can be offered), it can be useful to extend the number of entries, supported by providing a memory protection table within the memory system 10. Hence, by providing the memory protection table in the same memory system for which access is policed by the MPU 20, this provides the flexibility to provide a greater number of memory protection entries than is practical for a typical MPU based on registers storing region defining data for each entry which is compared in parallel to a target address. It may be counterintuitive that moving the memory protection table into the memory system (which is typically slower to access than registers) would provide improved software performance. However, although accessing an individual memory protection entry from the memory system may be slower, the overall performance may be improved by avoiding software workarounds discussed below for dealing with cases where the number of entries supported by the MPU in hardware is insufficient to deal with the requirements of the software, which would otherwise incur a great performance cost by encountering frequent exceptions due to accesses to undefined regions of the address space. With a memory protection table provided in memory, the hardware costs scale much less steeply with the number of entries.

Also, by permitting each region to have an arbitrary size corresponding to a number of bytes other than a power of 2, this means that each region can cover a large amount of memory and it is not necessary to subdivide regions intended to have the same access permissions into multiple separate entries, which would otherwise be at risk of causing memory protection faults when addresses cross a region boundary. This makes the MPU better than an MMU at servicing real time applications which require critical operations to be handled with a fast and/or deterministic response time.

This approach of using memory to store the memory protection entries can be useful for a number of purposes. For example, a piece of software may require a greater number of distinct address regions to be defined with different access permissions than is supported in hardware in the number of protection entries supported in registers of the MPU. If no memory protection table was provided in memory, at any given time at least some parts of the address space required to be accessed by that software would not currently have a corresponding memory protection entry defined for it. This would mean that an access to an address in a currently undefined region of the address space would trigger an exception which would then require software to step in and reconfigure the registers of the MPU, so as to overwrite the parameters previously defined for a different region with the parameters required for the region needed to be accessed now. If a later instruction then accesses the previously defined region which has been overwritten, this may then cause the MPU configuration to be switched back again. This constant switching of the contents of the MPU registers, needing an exception to trigger the switching each time, may greatly harm performance.

Another example can be where the processor needs to execute multiple pieces of software which are mutually distrustful, but which need to share data between them. To enable the sharing of data a given piece of software may wish to divide up portions of the address space so that only limited portions of the address space are accessible to other processes, but to provide such fine degree of control over access to the address space, this may require additional address regions to be defined, and there may not be enough spare memory protection entries supported by the MPU in hardware to allow such fine grained control. Hence, in practice the same data may end up being copied into multiple parts of the address space, one copy in the part accessed by the first software and another in the part accessed by the second software, which results in time being wasted to perform the copying and inefficient use of the memory capacity available, which can be a particular problem in systems with constrained memory resources.

These issues can be avoided by providing the memory protection table in memory so there is support for a much greater number of separate memory protection entries, which can improve performance.

Figure 2:
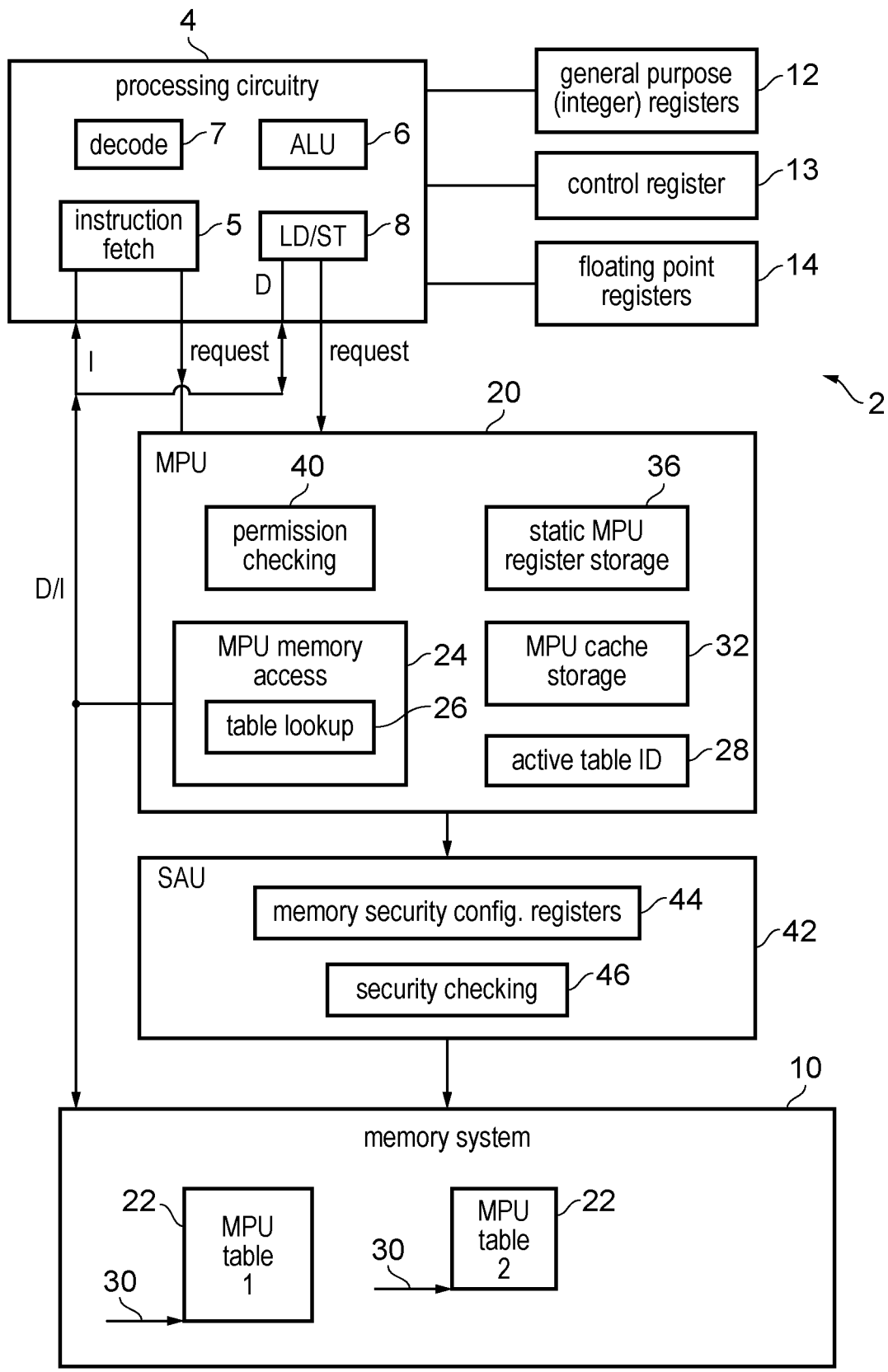
FIG. 2 shows in more detail an example where the memory attribute checking circuitry includes a memory protection unit which checks memory accesses against access permissions defined in a memory protection table stored in a memory system.

Hence, FIG. 2 shows a second example of the processing system 2 in which the memory protection table 22 is provided in the memory system 10 for access by the MPU 20. With this example, access permissions for controlling whether the processing circuitry 4 is allowed to access a given address region may be defined by the MPU 20 in two ways. A memory protection table 22 may be stored within the memory system, comprising a number of entries each defining access permissions for a corresponding address region. The MPU 20 has MPU memory access circuitry 24 for initiating memory access requests to the memory system 10 in order to obtain information from the MPU table 22. The MPU memory access circuitry 24 has table lookup circuitry 26 for performing the comparisons needed to identify whether the MPU table 22 includes an entry for an address region comprising the target address specified by the memory access request received from the processing circuitry 4. The memory system 10 may store more than one MPU table, each table 22 associated with a respective software process. An active table identifier, identifying which particular MPU table is to be accessed using the MPU memory access circuitry 24, is stored in an active table identifier register (or group of registers) 28. For example the active table identifier register 28 may specify a base address 30 of the currently active MPU table, and could also optionally specify a size of the active table. MPU cache storage 32 is provided within the MPU for caching selected entries of the MPU table(s) from the memory system 10, so that if the same entry is needed again then it can be accessed faster. For example the MPU cache storage may comprise a set of registers for locally storing entries of an MPU table with reduced access latency compared to the backing store for the MPU table 22 in memory system 10.

Another way to provide access permissions for controlling access to the memory system 10 may be to define statically configured memory protection entries within static MPU register storage 36. The processing circuitry 4 may support instructions for configuring the contents of the static MPU register storage 36, such as a dedicated type of instruction specifically intended for accessing the static MPU register storage, or could use a more general store operation performed by the load/store unit 8 which specifies as the target address an address which has been mapped to the memory mapped registers provided for the static MPU register storage 36. In general, once an MPU parameter reconfiguration operation (e.g. one of these memory mapped load/store operations or the dedicated type of reconfiguration instruction) has been executed to populate contents of the static MPU register storage 36 to define a given memory protection entry corresponding to a given address region, in the absence of a reset or power down event causing loss of information stored in the static register storage 36, that given memory protection entry remains in the static MPU storage 36 until another MPU parameter reconfiguration operation changes the contents of that entry. This is unlike the MPU cache storage 32 for which even if there was no MPU parameter reconfiguration operation to change the actual parameters set for a given address region, the contents of the MPU cache storage 32 may vary over time according to a cache replacement policy. For example the MPU cache storage 32 may be associated with a cache controller which uses a least recently used or similar replacement policy to evict entries predicted to be least useful in future, when space needs to be made for a more recently accessed entry of the memory protection table 22 in memory system 10.

While FIG. 2 shows the static MPU register storage 36 being separate from the MPU cache storage 32, in other examples these could be respective portions of a common storage structure. For example, some entries of a common storage structure could be marked with a flag to indicate that they should be considered to be static entries which are not to be evicted through the cache replacement policy. However, in practice providing separate storage structures 32, 36 may allow more efficient indexing into the cache storage 32.

The MPU comprises permission checking circuitry 40 for reading the access permission data specified in either the looked up entry of the memory protection table 22 stored in the memory system 10 (or cached in the MPU cache storage 32) or a statically configured MPU entry specified in the static MPU register storage 36, and determining whether properties of the memory access request issued by the processing circuitry 4 meet the requirements specified by the access permissions for the entry selected based on the target address of the memory access request. For example the access permissions may specify whether the region is to be a read only region (for which any write request triggered by a store instruction executed by the processing circuitry 4 should be rejected) or is allowed to be both read and written. The access permissions could also specify whether the fetch unit 5 is allowed to fetch instructions from the corresponding address region. The access permissions could also restrict access to the corresponding address region to certain exception levels or privilege levels of the processing circuitry 4, and the permission checking circuitry 40 could check whether a current exception level or privilege level associated with the memory access request meets the restrictions defined in the access permissions.

While the example of FIG. 2 does not show the separation of the secure and less secure MPUs 21, 23 as in FIG. 1, it will be appreciated that such separate MPUs could still be provided in this example, with each of the secure MPU and less secure MPU configured as in the example 20 shown in FIG. 2. For example the secure and less secure MPUs may specify different base addresses for the corresponding MPU tables 22 in memory and may have separate registers for the static MPU register storage 36 and/or MPU cache storage 32.

The example of FIG. 2 also has an SAU 42 as in FIG. 1, which comprises memory security configuration registers 44 defining the security attribute entries which define secure/less secure regions of the address space, and security checking circuitry 46 for checking a target address against the security attribute entries to determine whether a memory access can be permitted. While in this example, the security attribute entries are purely register based, other examples could provide a security attribute table in memory 10 similar to the MPU table 22, with the SAU comprising equivalent circuits to circuits 24, 36, 32, 28 of the MPU 20, but for looking up security attribute entries instead of memory protection entries.

Figures 3, 4:
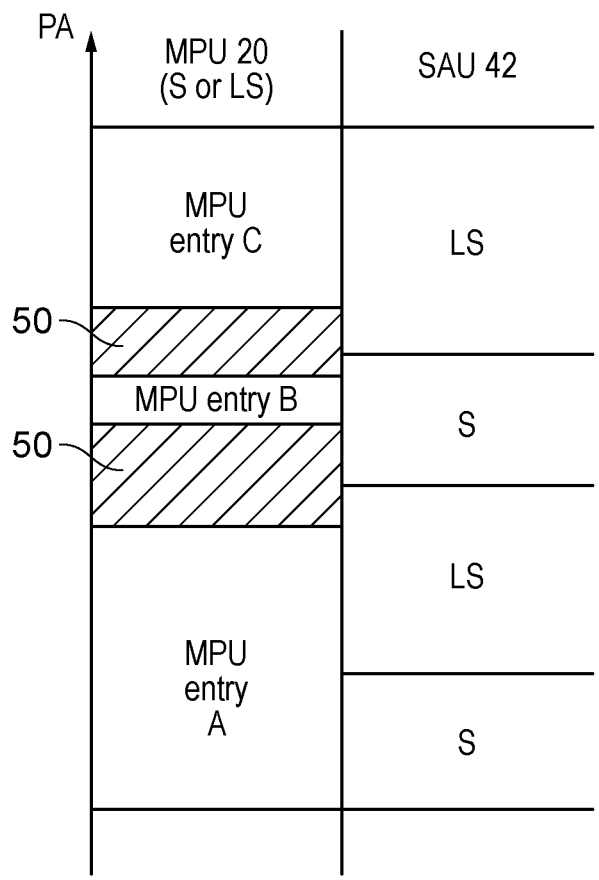
FIG. 3 shows an example of overlapping permissions set by a memory protection unit and a security attribute unit.
FIG. 4 shows examples of different operating states of the processing circuitry, including different domains, modes and privilege levels.

Hence, as shown in FIG. 3, the MPU (secure or less secure depending on the current domain of operation) and the SAU 42 may both define orthogonal sets of access permissions for different regions of the address space. For the SAU 42, a region may be defined as being associated with the secure domain or less secure domain. In the MPU 20, regions A, B, C may be defined as shown in FIG. 3, with each region having some properties defined such as the read only or readable/writeable status, a restriction on privilege levels which can access the address region, or other information such as a region type defined for the corresponding region, such as whether the region is a device type region for which the reordering of memory accesses by the memory system may be restricted. It is not essential for the MPU 20 or SAU 42 to define memory protection entries for every part of the address space. For example, there may be some regions marked 50 in FIG. 3 for which no MPU entry has been defined. If there is an access by the processing circuitry 4 to an address in one of these regions then the memory access may be rejected and a fault may be triggered. In the example of FIG. 3, both the MPU 20 and the SAU 42 define the memory address regions based on addresses in a physical address space accessed based on a physical address directly identifying corresponding locations in the memory system 10. However, it may also be possible for the MPU 20 or SAU 42 to apply a limited form of address translation, such as adding a constant offset to the address provided by the processing circuitry 4 in order to obtain the corresponding physical address to be provided to memory 10.

In general, the MPU entries may be expected to be defined by software as non-overlapping. Some implementations may provide hardware logic for checking, when configuring a given memory attribute entry, whether the entry overlaps with any other entry, and rejecting the update of the given memory attribute entry if so. However, this logic may be expensive in terms of hardware and performance (especially for the example of FIG. 2 which has a MPU table 22 defined in memory), as it may require comparisons against the address ranges defined in every other MPU entry. Therefore, other implementations may deem the cost of providing this logic too expensive, and so another approach may be that software is simply expected to define the memory attribute entries as defined non-overlapping memory regions, and the architecture may specify that security cannot be guaranteed if the software does not meet this requirement.

Similarly, the SAU entries could also be expected to be non-overlapping, which could either be enforced by hardware checks, or not be enforced by hardware with software being expected to comply with this requirement and security not being guaranteed if the software does not do this.

For the embodiment of FIG. 2, the entries of a given MPU table may be expected to define non-overlapping regions, but it may be permitted for a static MPU entry in the static MPU register storage 36 to define a region which overlaps with the address region defined by a memory-based MPU entry in the MPU table 22. If an address hits in both the static MPU register storage 36 and in a memory-based MPU entry, some implementations could use the permissions defined in the static MPU entry from the static MPU register storage 36, which may overrule any conflicting permissions defined in the matching memory-based MPU entry. Alternatively, another approach can be that if the static MPU entry permits the memory access, then the memory access can be permitted regardless of whether the matching memory-based MPU entry permits the memory access, but if the static MPU entry does not permit the memory access, the memory access could still be permitted if the matching memory-based MPU entry permits the memory access. Nevertheless, overlaps between regions associated with two static MPU entries may be prohibited, and similarly overlaps between regions associated with two memory-based MPU entries may be prohibited.

As shown in FIG. 4, the processing circuitry 4 may support a number of operating states in which instructions can be executed. These may include domains, modes and privilege levels. The processing circuitry 4 may support at least two security domains of operation, including at least a secure domain S and a less secure domain LS. In general the system operates in the secure domain when processing program code stored in one of the secure regions of the address space defined by the SAU 42, and operates in the less secure domain when executing code from a less secure region defined by the SAU 42. In the less secure domain, the secure regions of the address space are inaccessible.

In addition, the processing circuitry 4 may have a number of modes, including a thread mode T for background processing and a handler mode H for exception handling. It can be useful to separate the thread and handler modes to simplify handling of exceptions, for example the control over which registers are accessible to the processing circuitry 4 may depend on whether the system is in thread or handler mode.

In addition, the system may have a number of privilege levels including at least a more privileged level and a less privileged level. For simplicity these levels will be described as privileged and unprivileged below, but it will be appreciated that in other examples there could be three or more different privilege levels and so the term unprivileged may simply refer to one of the less privileged levels for which there is at least one other privilege level with greater privilege. In the handler mode, the system may by default operate in a privileged state. In the thread mode, the current privilege level may be either privileged or unprivileged depending on a current privilege indicator maintained in one of the control registers 13. Separate banked versions of the current privilege indicator may be defined for the secure and less secure domains respectively, so that, for instance, the thread mode could be defined as being privileged when in the secure domain but unprivileged when in the less secure domain.

Figures 5A, 5B, 6, 7:
FIGS. 5A and 5B show examples of a range checking instruction.
FIG. 6 shows an example of information stored to a destination register of the range checking instruction.
FIG. 7 illustrates a number of variants of the range checking instruction.

FIG. 5A shows an example of a range checking instruction (TT instruction) that can be used to query the memory attributes defined by the MPU 20 and the SAU 42. The TT instruction specifies a destination register Rd to which a status value is to be written in response to the TT instruction. The TT instruction also specifies parameters defining a first address #add1 and a second address #add2. The first and second addresses may be defined in a number of ways by the TT instruction, for example using register specifiers indicating general purpose registers 12 storing values defining the addresses, e.g. explicitly identifying the addresses in respective registers, or specifying the addresses through a base address and offset. The addresses could also be defined so that the first address #add1 is identified in a register, but the second address is identified as a multiple of a size value and a multiplier, where one or both of the multiplier and the size value are variable. The variable multiplier and/or variable size value could be identified in a register by an immediate value, or by a configuration indicator in one of the control registers 13. In general, the encoding of the TT instruction may be either constrained so that the first address #add1 is constrained to be less than the second address #add2, or if the encoding permits the second address #add2 to be less than the first address #add1, then the processing circuitry 4 may trigger a fault if it is detected that for a given instance of the TT instruction the second address #add2 is less than the first address #add1.

FIG. 5B shows another example of a range checking instruction (TT instruction), as described above this instructions writes a status value to the destination register specified by Rd. However, in this example the first address is read from a general purpose register 12 specified by the Rn parameter. Another general purpose register 12 specified by the Rm parameter is read, and the size value (offset) read from Rm is added to the first address to produce the second address. Optionally, the size value can be shifted left by amount specified by the immediate value #imm, effectively allowing the size value read from the register specified by the Rm parameter to be multiplied (eg a shift of 1 corresponds to a multiply by 2, a shift of 2 corresponds to a multiply by 4, and so on). Hence the value in the register specified by Rm may be the length (number of elements) of an array, and for common array element sizes (e.g. 4 bytes for an array of 32-bit words) the TT instruction can calculate the second address (i.e. the end address of the array) without any additional instructions being required.

In response to the TT instruction, the memory attribute checking circuitry 16 looks up the MPU 20 and SAU 42 based on the first and second addresses and records in the destination register Rd an indication of whether the first and second addresses map to the same memory protection entry of the MPU 20 and whether the first and second addresses map to the same security protection entry of the SAU 42. In addition, the destination register Rd may also be written with information derived from a matching entry of the MPU 20 or SAU 42 in the case when the first address and the second address is mapped to the same entry.

For example, as shown in FIG. 6 the destination register Rd may be written with a number of pieces of information including the following:

MVALID, which indicates whether the first address and the second address both correspond to the same memory protection entry of the MPU 20;

SVALID, which indicates whether the first address and the second address map to the same security protection entry of the SAU 42;

A read permission flag R, which (at least when the first and second addresses correspond to the same MPU entry) specifies whether a memory access to the address region corresponding to that matching entry would be permitted;

A read/write permission flag RW, which indicates (at least when the first and second addresses correspond to the same MPU entry) whether both read and write accesses would be permitted by the access permissions in the matching entry;

A security domain flag S which indicates whether the first and second addresses correspond to a secure region or less secure region (at least when the first and second addresses correspond to the same SAU entry);

A combined indicator LSR, which is set to 1 if the following conditions are all satisfied: the security flag S indicates that the first and second addresses correspond to the less secure domain, the read flag R indicates that read accesses are permitted, and the SVALID and MVALID indicators are both equal to 1. LSR is set to 0 if any of these conditions are not satisfied;

A second combined indicator LSRW which is set to 1 if the following conditions are all satisfied: the security domain associated with the first and second addresses is the less secure domain, the read/write flag RW is 1 indicating that read and write accesses are permitted, and the SVALID and MVALID indications are both equal to 1. If any of these conditions is not satisfied, then LSRW is 0.

Setting of the combined indicators in hardware in response to the TT instruction is useful for allowing relatively common forms of security checks to be performed quickly by testing a single bit of information (rather than needing to test combinations of two or more values, which could otherwise require more instructions). In some cases, in addition to writing these combined indicators to the destination register Rd, the processing circuitry 4 could, in response to the TT instruction, also update condition flags within a control register 13 based on one or more of the pieces of information shown in FIG. 6, (e.g. based on the combined indicators), so that a subsequent conditional instruction can directly trigger a conditional operation based on whether the condition flags meet some test condition. For at least some forms of security checking, this can avoid the need for a subsequent compare instruction to compare the parameters in the register Rd in order to decide what conditional operation should be performed, which can help to improve code density.

It will be appreciated that the information shown in FIG. 6 is just one example, and other combinations of information derived from the matching entries of the MPU or SAU when the first and second addresses map to the same entry could be provided.

For example, in some implementations the SVALID and MVALID could be omitted entirely, and the combined indicator fields LSRW and LSR could serve as the status value indicating whether the first and second addresses map to the same attribute entry, as well as indicating additional information derived from the attributes of the matching entry in cases when the addresses do map to the same entry. For example, when LSRW or LSR=1, it can be deduced that the addresses map to the same attribute entry in both SAU and MPU. In the case where LSRW or LSR=0, it may not be considered important in some embodiments to distinguish whether this is because the addresses mapped to different entries (and if so which of the MPU and SAU mapped the addresses do different entries), or because the matching entry specified attributes that prohibit access to the corresponding region.

Also, it is not essential for the status value to return separate indications of read only or read/write permissions. In other implementations, a parameter in the instruction encoding of the TT instruction could specify whether the permissions are to be checked for a read access or a write access, and a single permission indicator (replacing RW/R) or combined indicator (replacing LSRW and LSR) could then indicate whether the specified type of memory access (read or write) would be permitted in the address range between the first address to the second address.

This instruction can be useful when software is checking the permissions of pointers originating from untrusted software (e.g. non-secure software operating in the less secure domain or unprivileged software operating at an unprivileged level). This can be useful for example for avoiding the confused deputy attack, where less secure untrusted software may attempt to trick more secure or more privileged software into performing an access to an inappropriate region of memory (that may not be accessible to the less secure untrusted software) by passing an inappropriate pointer to an array which will then be accessed by the more secure software. By using the TT instruction with the first and second addresses corresponding to the start and end addresses of an array in memory, the trusted software can check whether (provided software has not defined overlapping memory attribute regions) every word in that array is accessible by the untrusted software that passed it the pointer to the array. This type of instruction can allow the processor to quickly check whether any pointer within the bounds of the array is accessible to the untrusted software.

The format of instructions shown in FIGS. 5 and 6, which defines two addresses and checks whether both addresses are in the same address region of the MPU and/or SAU can be particularly useful for the implementation shown in FIG. 2 where the memory protection table 22 is stored in the memory system 10. By specifying within a register the MVALID or SVALID information, rather than for example returning a region number associated with a given address, this can scale much better to memory protection tables 22 which support extremely large numbers of memory protection entries. Also, returning a single bit flag indicating whether the first and second addresses map to the same entries (instead of a region number associated with a given address) means that there is no need for the MPU cache storage 32 to store within each cache entry the full region number of the corresponding memory protection entry for querying by the TT instruction. Since entries in the MPU cache storage 32 may typically be register based rather than SRAM, avoiding the need to store the region numbers of each MPU entry within the cache storage 32 can provide a significant area reduction.

As shown in FIG. 7, a number of variants of the TT instruction could be provided for checking against the access permissions defined by different combinations of operating states of the processing circuitry 4. In a first variant of the TT instruction, the MPU and SAU may be looked up based on the access permissions of a current security domain and a current mode of the processing circuitry 4. Hence, in response to the TT instruction the relevant one of the secure and less secure MPUs 21, 23 may be selected based on the current domain of operation, and whether the access permissions in the relevant MPU are looked up assuming an unprivileged access or a privileged access may be selected based on the current mode of the system and the current privilege level used in the current mode. For example if the current mode is handler mode then the access may by definition be assumed to be privileged, whereas if the current mode is thread mode then whether or not a privileged or unprivileged lookup is performed may depend on a parameter stored in one of the control registers 13. In an unprivileged lookup, the R or RW flags may be 0 if the region is not allowed to be accessed by unprivileged code.

For a second variant (TTA) of the TT instruction, the processing circuitry 4 may trigger a fault if the instruction is attempted to be executed while in the less secure domain, and if the TTA instruction is executed in the secure domain then instead of looking up the secure MPU 21 as for the first variant instruction, the MPU lookup may instead be made to the less secure MPU 23. This can be useful for allowing software operating in the secure domain to check whether certain memory accesses would have been permitted if they had been performed by less secure code, which can be useful for sanitising pointers provided by less secure code to prevent a confused deputy attack. For the second variant, the MPU lookup may be based on the privilege level which would be associated with the current mode of operation when the system is operating in the less secure domain. In some cases, the privilege level assumed for the lookup may be different to the current privilege level at the time of executing the TTA variant of the instruction. For example, if the TTA instruction is executed in the secure domain and thread mode when the current privilege level is privileged, but the banked version of the thread mode privilege indicator for the less secure domain defines that the thread mode should be unprivileged in the less secure domain, then the TTA instruction may trigger a lookup of the less secure MPU 23 based on the unprivileged state associated with the thread mode in the less secure domain, rather than the current privileged state associated with the thread mode in the secure domain.

FIG. 7 also shows a third variant of the instruction (TTT) which checks the MPU 21, 23 associated with a current security domain, but forces a lookup of the MPU based on the unprivileged states regardless of the current privilege level of the processing circuitry 4. Hence, even if the processing circuitry 4 is currently in a privileged state, the parameters R, RW etc. in FIG. 6 may be set to indicate whether reads or read/write operations would have been permitted if the processing circuitry 4 had currently been in an unprivileged state. This can be useful for allowing more privileged code to check against the unprivileged permissions which would be accessible to less privileged code, so that pointers provided by the unprivileged code can be checked. For the third variant, a fault is triggered if the third variant is executed in the unprivileged state.

Similarly, a fourth variant of instruction (TTAT) may be provided which combines the properties of the second and third variants of the instruction. For the fourth variant a fault is triggered if the fourth variant is executed in either the unprivileged state or the less secure domain. The fourth variant triggers a lookup of the less secure MPU 23 even if executed in the secure domain, and triggers a lookup based on the unprivileged permissions defined for unprivileged memory accesses even if executed in a currently privileged state.

Hence, the first to fourth variants define a number of instructions which allow cross-operating state checks of memory access permissions so that more trusted code can check whether less trusted code would have been allowed to access the addresses bounded by the first and second addresses, which can be useful for checking pointers passed by less trusted code to more trusted code. It will be appreciated that not all of the first to fourth variants of the instruction need to be supported in the instruction set architecture for a given implementation. Any subset of one, two or more of these variants could be supported. The different variants of the instruction could be distinguished in different ways, e.g. using different opcodes, or if the variants share the same opcode using another parameter defined in the instruction encoding of the instruction. For example a variant field may be provided within the instruction encoding to identify which variant is used. In other examples, the encoding of the instruction may be the same for the different variants, but a parameter stored in a control register 13 could be set to specify whether TT instructions should be treated as the first, second, third or fourth variant.

Figure 8:
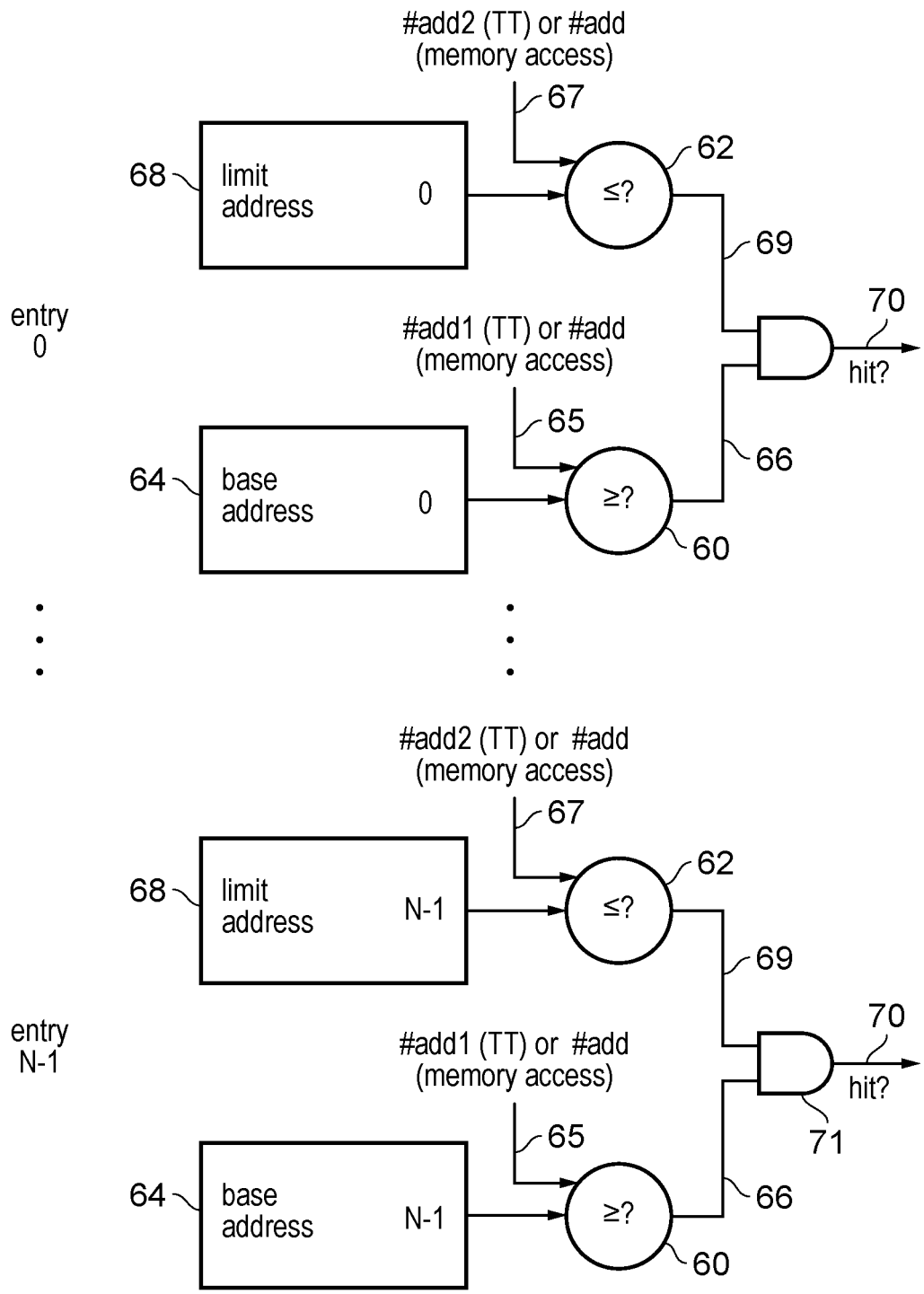
FIG. 8 shows an example of using comparators to lookup whether a first address and a second address correspond to the same memory attribute entry.

One may expect that providing lookup circuitry for looking up whether the first and second addresses map to the same memory attributes entry could be relatively expensive in terms of performance and hardware as it may require two separate lookups for each of the addresses. However, in practice this is not required and a single lookup can identify whether both addresses map to the same entry. As shown in FIG. 8, the region checking hardware may typically include an array of comparators 60, 62, where each memory attribute entry supported in static registers 36 or in cache storage 32 may be associated with a set of two comparators 60, 62. These comparators include a lower bound comparator 60 which compares an input address against the base address 64 of the corresponding address region and outputs a hit signal 66 which is asserted if the input address 65 is greater than or equal to the base address 64. Also for each entry provided in static registers 36 or cache storage 32 a second upper bound comparator 62 may be provided which compares the input address 67 with the limit address 68 defining the upper limit of the corresponding address region and asserts a hit signal 69 if the input address 67 is less than or equal to the limit address 68. A region hit signal 70 may be generated by an AND gate 71 and is set to 1 if the lower bound hit signal 66 and upper bound signal 69 are both asserted.

For a regular memory access, the target address #add of the memory access may be supplied to both the lower bound comparator 60 as the input address 65 and to the upper bound comparator 62 as the input address 67.

For implementing the TT instruction which needs to compare two separate addresses it is possible to supply the first address #add1 as the input address 65 to each lower bound comparator 60, and supply the second address #add2 as the input address 67 to each upper bound comparator 62. Provided that the first address #add1 is less than the second address #add2, then the hit signal 70 for a given entry will indicate whether or not the first and second addresses both map onto that entry. If the first and second addresses map to different entries then none of the region hit signals 70 for the respective entries will be asserted. If the first and second addresses do correspond to the same entry then only the hit signal 70 for that matching entry will be asserted. Hence, it is possible to execute the TT instruction shown in FIG. 5 with little additional performance and area impact (and little additional lookup time compared to a single address lookup) as the instruction can simply reuse the comparators 60, 62 which are typically already provided for checking existing memory accesses. As only a single lookup of the comparator network is required, the form of the TT instruction shown in FIGS. 5 and 6 has an additional benefit compared to alternative examples which would trigger return of a region number associated with a single address, in that only a single TT instruction needs to be executed instead of separate instructions for checking the first and second addresses against the region numbers. As the TT instruction may be expected to be on the critical path for some interrupt latency sensitive tasks where every cycle counts, this can be a significant advantage.

Figure 9:
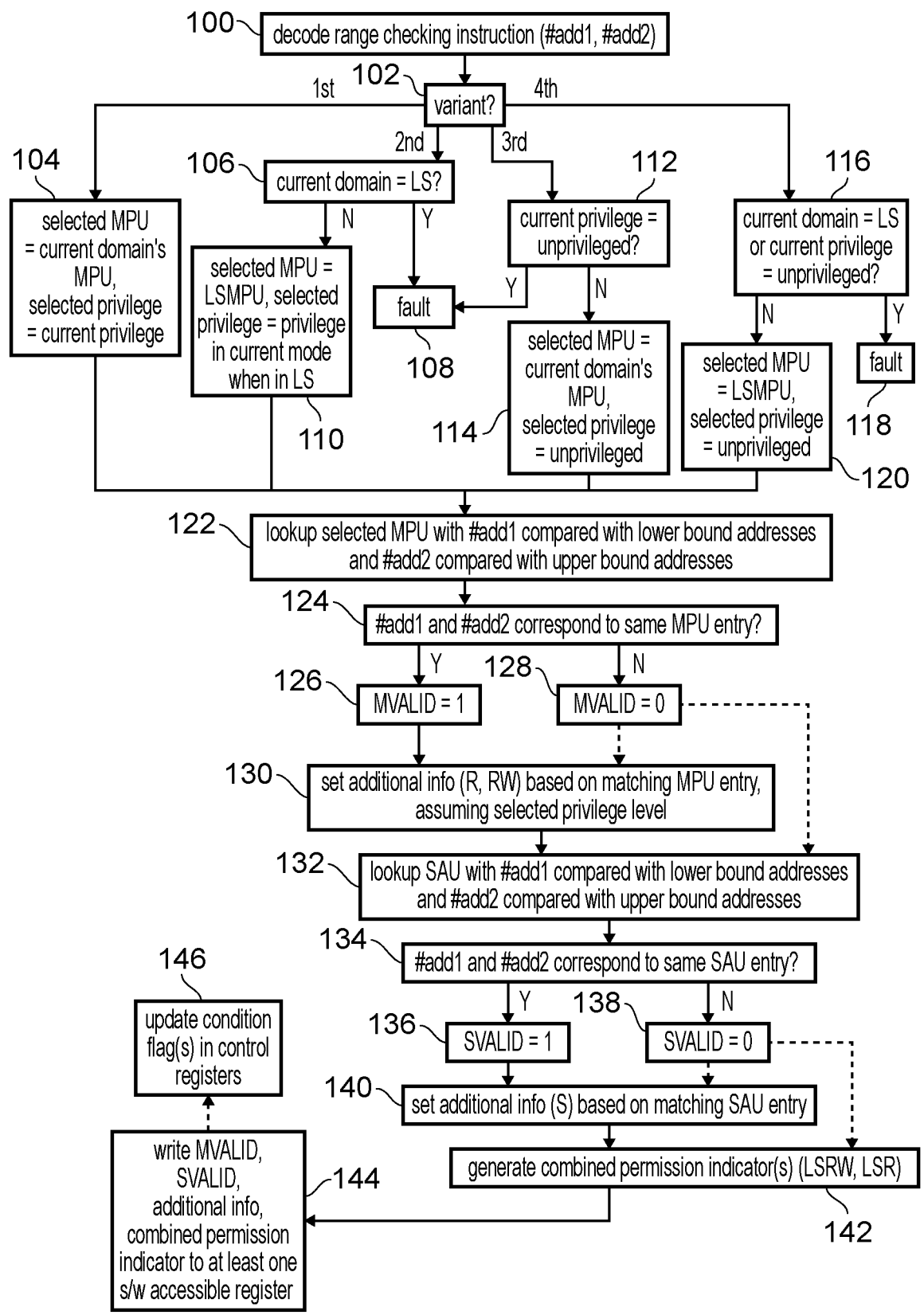
FIG. 9 illustrates a method of processing a range checking instruction.

FIG. 9 illustrates a flow diagram showing a method of processing a range checking instruction. At step 100 a range checking instruction is decoded by the instruction decoder 7. The range checking instruction identifies address identifying parameters for identifying a first address #add1 and a second address #add2. In this example the range checking instruction has an encoding which constrains the first address #add1 to be less than the second address #add2, but if this is not the case then a fault may be triggered if for a particular instruction the address identifying parameters identify that the second address #add2 is less than the first address #add1.

At step 102 the decoder 7 identifies which variant of the range checking instruction is being decoded. This may be based on a parameter in the instruction encoding itself or a parameter stored in a control register 13. Based on the variant, the instruction decoder 7 generates control signals to determine which of the secure and less secure MPUs 21, 23 should be the selected MPU to lookup in response to the instruction, and which privilege level should be the selected privilege level to assume for checking the access permissions in the relevant MPU.

If the instruction is of the first variant then at step 104 the selected MPU is determined to be the one of the secure and less secure MPUs 21, 23 which corresponds to the current security domain of the processing circuitry 4, and the selected privileged level is the current privilege level of the processing circuitry 4.

If the variant is the second variant then at step 106 the system checks whether the current security domain is the less secure domain, and if so then at step 108 a fault is triggered. Hence execution of the second variant may be restricted to execution in the secure domain. If the current domain is the secure domain then at step 110 the selected MPU is determined to be the less secure MPU 23 and the selected privilege level is the privilege level associated with the current mode when the processing circuitry 4 is operating in the less secure domain.

If at step 102 it is identified that the variant of the range checking instruction decoded is the third variant, then at step 112 it is checked whether the current privilege level is an unprivileged state, and if so then again at step 108 a fault is triggered. Hence execution of the third variant is restricted to a more privileged state. If the current privilege level is not the unprivileged state, then at step 114 the selected MPU is determined to be the one of the secure and less secure MPUs 21, 23 associated with the current security domain, and the selected privilege level is forced to be unprivileged regardless of the current privilege level in which the processing circuitry 4 is operating.

If the variant of the instruction is the fourth variant, then at step 116 it is determined whether the current security domain is the less secure domain and/or the current privilege level is the unprivileged state. If either the current domain is the less secure domain or the current privilege level is the unprivileged state then at step 118 a fault is triggered. Hence, execution of the fourth variant is restricted to when the processing circuitry is in the secure domain and a more privileged state. If the current domain is not the less secure domain and the current privilege level is not the unprivileged state, then at step 120 the selected MPU is determined to be the less secure MPU 23 and the selected privileged level is determined to be the unprivileged state regardless of the current privilege level of the processing circuitry 4.

Regardless of which variant is encountered, at step 122 the memory attribute checking circuitry 16 is controlled to lookup the selected MPU with the first address #add1 compared with the lower bound addresses of each entry and the second address #add2 compared with the upper bound addresses of each entry. In the example of FIG. 2, the entries in the static MPU register storage 36 and the MPU cache storage 32 may be looked up and if there is no hit of either the first address or the second address against any of the entries then it may be needed to perform a table lookup 26 to obtain a memory protection entry from the MPU table 22 in memory. This table lookup can be based on either the first address or the second address since whichever entry is returned can then be queried to determine whether the other of the first and second addresses also matches the same entry. For execution of the TT instruction in cases where one of the first and second addresses matches one of the entries within the static MPU register storage 36 or the MPU cache storage 32, there is no need to trigger a table lookup to the memory system because it will be known from the entry stored locally within the MPU 20 whether the second address also matches the same entry.

At step 124 it is determined whether the first and second addresses correspond to the same MPU entry of the selected MPU. If so then at step 126 the MPU status valid indicator MVALID is set to 1 to indicate that the first and second addresses correspond to the same memory attribute entry, while if the first and second addresses do not correspond to the same entry then at step 128 MVALID is set to 0. If MVALID is equal to 1 then at step 130 attribute information, such as the R and RW flags indicating whether read access is permitted, or both read and write access are permitted, are set based on the information specified in the matching MPU entry, assuming the selected privileged level selected at one of steps 104, 110, 114, 120. Step 130 could be omitted if the first and second addresses do not correspond to the same MPU entry at step 124. Alternatively, step 130 could be performed even if the first and second addresses do not correspond to the same MPU entry, e.g. setting the attribute information based on the information from the entry corresponding to the first address regardless of whether the second address also matches the same entry. It is not a problem to set the attribute information based on the entry associated with the first address alone, since it may be qualified by the MVALID flag which indicates whether this information can be trusted as also covering the second address. Hence in some implementations it may be simpler in circuit logic to always set the attribute information R, RW regardless of whether the first and second addresses correspond to the same MPU entry rather than providing logic for suppressing updates of the attribute information based on whether the first and second addresses correspond to the same entry. The two alternative dotted lines following step 128 show alternative options which could be implemented.

At step 132 the SAU 42 is looked up, again with the first address compared with the lower bound addresses of each security protection (SAU) entry and the second address compared with the upper bound addresses of each security protection entry. At step 134 the processing circuitry determines whether the first and second addresses correspond to the same SAU entry and if so then at step 136 the security status value SVALID is set to 1 while at step 138 SVALID is set to 0 if the first and second addresses do not correspond to the same SAU entry. At step 140 attribute information (e.g. the security domain flag S indicating whether the matching entry defined as secure or less secure region of the address space) is set based on the information specified in the matching SAU entry. Step 140 is performed at least in the case where the first and second addresses correspond to the same SAU entry, but (for similar reasons to those for the MPU lookup) following step 138 either step 140 could be performed or it could be omitted. While the example of FIG. 9 shows steps 132 to 140 being performed sequentially after steps 122 to 130, in other examples the SAU lookup could be performed before the MPU lookup or the MPU and SAU lookups could be performed in parallel.

In cases when MVALID=1 and SVALID=1, then provided that software has not set the SAU or MPU to have overlapping entries in the range between the first and second addresses, it can be guaranteed that the permissions indicated by the S, R, RW parameters apply to the whole range between the first and second addresses. If software has defined overlapping regions, then this property cannot be guaranteed. As discussed above, it may not be considered justified to incur cost in providing hardware logic to enforce that the MPU regions are non-overlapping and the SAU regions are non-overlapping.

At step 142 the processing circuitry may generate a combined permission indicator based on a combination of the information derived from a matching SAU entry and the information derived from the matching MPU entry. Again, this step could be performed at least if both MVALID is 1 and SVALID is 1, but could be omitted if either MVALID or SVALID was 0 or performed regardless (for similar reasons to those discussed above). In this example two combined permission indicators are generated: a first indicator LSR which indicates whether the access is to a less secure region and whether a read access to that region would have been permitted in the selected privilege state when looked up in the selected MPU, and a second indicator LSRW which indicates whether the matching address region is a less secure region and whether both reads and writes would have been permitted in the selected privilege level when looked up in the selected MPU. These may represent common checks which it can often be useful to perform and so by providing a single bit indicator to combine the information from the different parameters looked up from the various entries, this can allow a subsequent check to be performed quickly. For example, if the security flag is assumed to be 1 when the region is associated with the secure domain and 0 when the region is associated with the less secure domain, LSR may be set based on a result of (MVALID AND SVALID AND (NOT S) AND R), and LSRW may be set based on a result of (MVALID AND SVALID AND (NOT S) AND RW). Clearly, it is possible to use alternative mappings for some of these parameters (e.g. S=0 could indicate secure domain and S=1 could indicate less secure), in which case the combination of logical operations used to generate the combined permission indicators could vary.

At step 144 the processing circuitry 4 writes at least the status values MVALID, SVALID which indicate whether the first and second addresses correspond to the same MPU entry to a software accessible register, e.g. the destination register Rd specified by the range checking instruction. The attribute information determined at steps 130, 140, 142 may be written to the register as well. Optionally, at step 146 the instruction could also update condition flags in one of the control registers 13. These condition flags may be updated in response to condition flag setting instructions to specify various conditions of a previous processing result and can be tested by conditional instructions which specify a test condition to be satisfied by the condition flags and which trigger a corresponding conditional operation to be performed conditionally depending on whether the current values of the condition flag this satisfy this test condition. For example some of the condition flags may be set to values corresponding to the combined permission indicators, so that a subsequent conditional instruction can directly trigger an action to be performed conditionally based on the value of the combined permission indicators. The dotted line between step 144 and 146 indicates that step 146 is optional. Nevertheless the condition flags in the control register may represent another example of a software accessible location to which the status information indicating whether first and second addresses correspond to the same entry can be stored. In other examples the writing to the destination register could be omitted and the only result of the instruction could be to update the condition flags (e.g. step 144 being omitted). In other examples instead of writing values to registers a value could be written to memory indicating whether the addresses #add1, #add2 correspond to the same memory attribute entry.

In the example shown in FIG. 9, the instruction queries both the first set of memory attribute entries corresponding to the MPU 20 and a second set of attribute entries corresponding to the SAU 42. However the TT instruction may also be used in systems which only provide set of memory attribute entries to be checked, so it is not essential to return values for two different sets of memory attribute entries.

Figure 10:
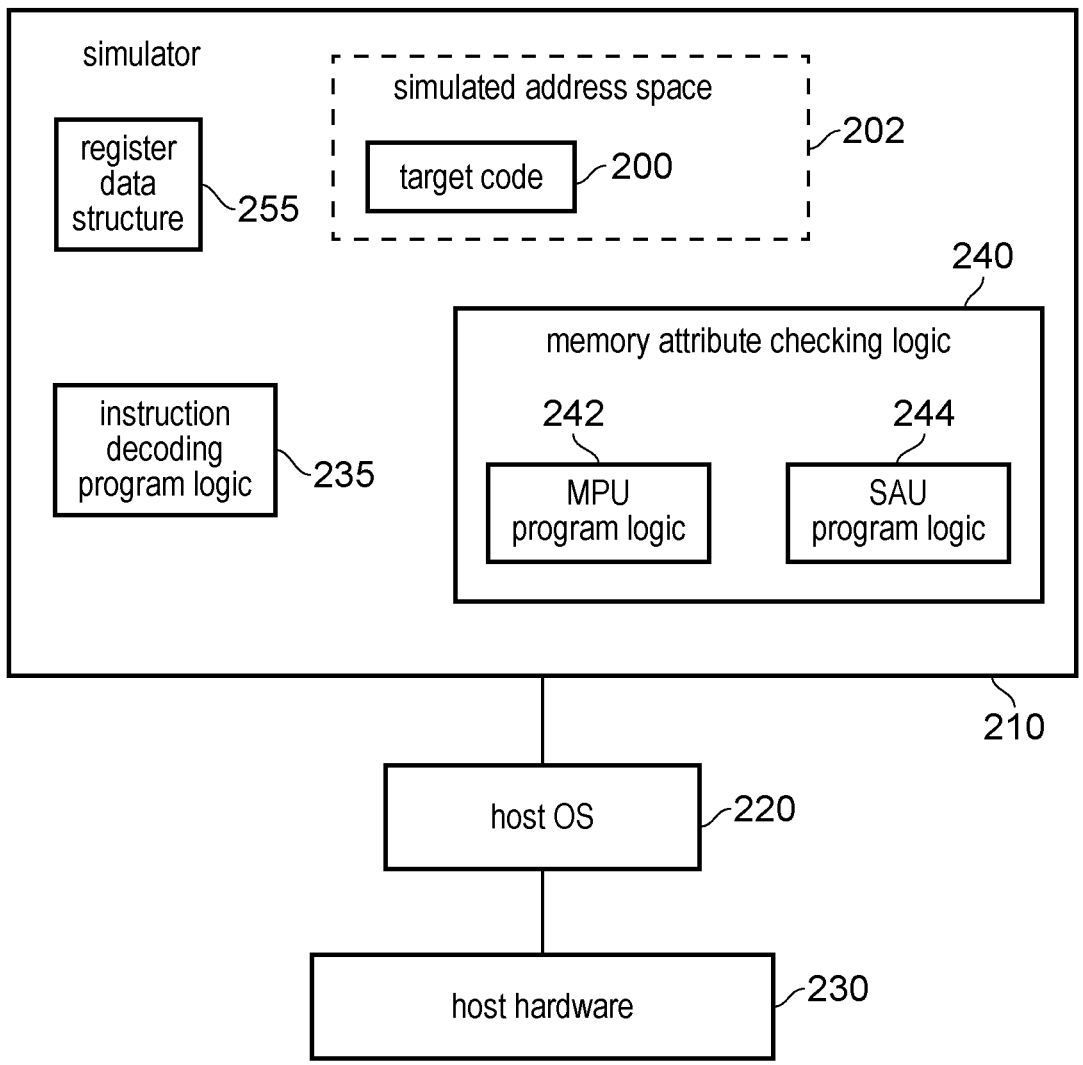
FIG. 10 illustrates a simulator example.

FIG. 10 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. Also, the physical address space used to access memory 6 in the hardware apparatus 2 could be emulated as a simulated address space 202 which is mapped onto the virtual address space used by the host operating system 220 by the simulator 210. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210, so that a host computer 230 which does not actually have the hardware features of the apparatus 2 discussed above can emulate these features. The simulator program may include instruction decoding program logic 235 and, memory access checking program logic 240 (including MPU program logic 242 and SAU program logic 244) which provide functionality which emulates the behaviour of the instruction decoder 7 and memory access checking circuitry 22 (including MPU 26 and SAU 24) of the hardware apparatus 2 of FIG. 1. The architectural registers 14 of the system 2 may also be emulated using a register data structure 255 maintained by the simulator code 210. Hence, the memory attribute checking and support for the TT instruction, can be performed by simulator program 210 in a corresponding way to the techniques discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
an instruction decoder to decode instructions;
processing circuitry to perform data processing in response to the instructions decoded by the instruction decoder; and
memory attribute checking circuitry to check whether a memory access request issued by the processing circuitry satisfies access permissions specified in a plurality of memory attribute entries, each memory attribute entry specifying access permissions for a corresponding address region of variable size within an address space; in which:
in response to a range checking instruction specifying address identifying parameters for identifying a first address and a second address, the instruction decoder is configured to control the processing circuitry to set, in at least one software-accessible storage location accessible to at least one type of instruction supported by the instruction decoder, a status value indicative of whether the first address and the second address correspond to the same memory attribute entry;
in which the memory attribute checking circuitry comprises at least one set of comparators, each set of comparators comprising a lower bound comparator and an upper bound comparator, wherein in response to the range checking instruction, the lower bound comparator is configured to compare the first address against a lower bound address of a given memory attribute entry and the upper bound comparator is configured to compare the second address against an upper bound address of the given memory attribute entry; and
in response to the range checking instruction, the instruction decoder is configured to control the processing circuitry to supply, in a single lookup of the at least one set of comparators, the first address to the lower bound comparator of each set of comparators and to supply the second address, in the single lookup, to the upper bound comparator of each set of comparators, to determine whether the first address and second address correspond to the same memory attribute entry based on the single lookup.

2. The apparatus according to claim 1, in which the memory attribute checking circuitry is configured to permit said variable size to be a number of bytes other than a power of 2.

3. The apparatus according to claim 1, in which the processing circuitry is configured to permit a difference between said first address and said second address to be a number of bytes other than a power of 2.

4. The apparatus according to claim 1, in which the address identifying parameters identify a base address register from which the first address is to be read and an offset for identifying a difference between the first address and the second address.

5. The apparatus according to claim 4, in which the offset is specified as a multiple and a size value, in which:
one of the multiple and the size value is a variable parameter specified by the range checking instruction, and
the other of the multiple and the size value is one of:
a fixed value;
an immediate value specified by the range checking instruction; and
a value stored in a register specified by the range checking instruction.

6. The apparatus according to claim 1, in which the address identifying parameters identify a first register from which the first address is to be read and a second register from which the second address is to be read.

7. The apparatus according to claim 1, in which said at least one software-accessible storage location comprises a destination register specified by the range checking instruction.

8. The apparatus according to claim 1, comprising a control register to store at least one condition status indication indicative of a property of a result of a previous condition status indicator producing instruction; in which:
in response to a conditional instruction, the instruction decoder is configured to control the processing circuitry to perform a conditional operation conditional on whether the at least one condition status indication stored in the control register satisfies a test condition; and
in response to the range checking instruction, the instruction decoder is configured to control the processing circuitry to set said status value by updating at least one of said at least one condition status indication in the control register.

9. The apparatus according to claim 1, in which in response to the range checking instruction, at least when the first address and the second address both correspond to the same memory attribute entry, the processing circuitry is configured to store to the at least one software-accessible storage location attribute information derived from a matching memory attribute entry corresponding to the first address and the second address.

10. The apparatus according to claim 9, in which the processing circuitry has a plurality of operating states; and
in response to at least one variant of the range checking instruction, the processing circuitry is configured to derive the attribute information based on access permissions that would be imposed on memory accesses to the corresponding address region for the matching memory attribute entry when in a different operating state to the current operating state of the processing circuitry.

11. The apparatus according to claim 1, in which the plurality of memory attribute entries comprises a plurality of memory protection entries each specifying access permissions indicative of at least one of:
whether the corresponding address region is read only or is both readable/writable; and which of a plurality of privilege levels of the processing circuitry are allowed to access the corresponding address region.

12. The apparatus according to claim 11, in which the memory access request comprises a request to access a memory system; and
the plurality of memory protection entries comprises a memory protection table, wherein the memory protection table is stored in the memory system.

13. The apparatus according to claim 12, comprising memory protection cache storage circuitry to cache at least one memory protection entry of the memory protection table obtained from the memory system.

14. The apparatus according to claim 1, in which the processing circuitry has a plurality of domains of operation including a secure domain and a less secure domain; and
the plurality of memory attribute entries comprises a plurality of security attribute entries, each specifying access permissions indicative of which of the plurality of domains is associated with the corresponding address region.

15. The apparatus according to claim 14, in which in response to at least one variant of the range checking instruction, at least when the first address and the second address both correspond to the same security attribute entry, the processing circuitry is configured to store to the at least one software-accessible storage location attribute information derived from a domain specified as associated with the corresponding address region by the same security attribute entry corresponding to the first address and the second address.

16. The apparatus according to claim 14, in which:
the plurality of memory attribute entries also comprise a plurality of memory protection entries each specifying access permissions indicative of at least one of:
whether the corresponding address region is read only or is both readable/writable; and
which privilege levels of the processing circuitry are allowed to access the corresponding address region; and
in response to at least one variant of the range checking instruction, at least when the first address and the second address both correspond to the same memory attribute entry, the processing circuitry is configured to store to the at least one software-accessible storage location at least one combined permission indication specifying, in a single indicator, whether access permissions in a matching memory protection entry corresponding to the first address and the second address and access permissions specified in a matching security attribute entry corresponding to the first address and the second address both specify that a given type of memory access is permitted.

17. The apparatus according to claim 1, in which an encoding of the range checking instruction constrains the first address to be lower than the second address.

18. The apparatus according to claim 1, in which in response to a range checking instruction for which the second address is lower than the first address the processing circuitry is configured to perform at least one of:
signal a fault; and
return the status value indicating that the first address and second address do not correspond to the same memory attribute entry.

19. An apparatus comprising:
an instruction decoder to decode instructions;
processing circuitry to perform data processing in response to the instructions decoded by the instruction decoder; and
memory attribute checking circuitry to check whether a memory access request issued by the processing circuitry satisfies access permissions specified in a plurality of memory attribute entries, each memory attribute entry specifying access permissions for a corresponding address region of variable size within an address space; in which:
in response to a range checking instruction specifying address identifying parameters for identifying a first address and a second address, the instruction decoder is configured to control the processing circuitry to set, in at least one software-accessible storage location accessible to at least one type of instruction supported by the instruction decoder, a status value indicative of whether the first address and the second address correspond to the same memory attribute entry; and
in response to the range checking instruction, at least when the first address and the second address both correspond to the same memory attribute entry, the processing circuitry is configured to store to the at least one software-accessible storage location attribute information derived from a matching memory attribute entry corresponding to the first address and the second address;
in which the processing circuitry has a plurality of security domains of operation including a secure domain and a less secure domain, and within each security domain the processing circuitry is configured to operate in one of a plurality of modes and in one of a plurality of privilege levels; and
the instruction decoder is configured to support at least one of the following variants of the range checking instruction:
a first variant for which the attribute information specifies whether a memory access to an address in a range between the first address and the second address would be permitted when the processing circuitry is in a current security domain, and a privilege level associated with the current mode;
a second variant for which the attribute information specifies whether a memory access to an address in the range between the first address and the second address would be permitted when the processing circuitry is in a different security domain to the current domain, and the privilege level associated with the current mode when operating in the different security domain;
a third variant for which the attribute information specifies whether a memory access to an address in the range between the first address and the second address would be permitted in a current security domain, and a different privilege level to the privilege level associated with the current mode; and
a fourth variant for which the attribute information specifies whether a memory access to an address in the range between the first address and the second address would be permitted when the processing circuitry is in a different security domain to the current domain, and a different privilege level to the privilege level associated with the current mode.

20. The apparatus according to claim 19, in which at least one of:

the instruction decoder is configured to support at least one of the second variant and the fourth variant, said different security domain comprises the less secure domain, and the processing circuitry is configured to trigger signaling of a fault in response to an attempt to execute said at least one of the second variant and the fourth variant when the processing circuitry is in the less secure domain; and the instruction decoder is configured to support at least one of the third variant and the fourth variant, said different privilege level comprises a less privileged privilege level than the current privilege level, and the processing circuitry is configured to trigger signaling of a fault in response to an attempt to execute said at least one of the third variant and the fourth variant when the processing circuitry is in at least one predetermined privilege level, where the plurality of privilege levels includes at least one more privileged privilege level than the at least one predetermined privilege level.

21. An apparatus comprising:

an instruction decoder to decode instructions;

processing circuitry to perform data processing in response to the instructions decoded by the instruction decoder; and memory attribute checking circuitry to check whether a memory access request issued by the processing circuitry satisfies access permissions specified in a plurality of memory attribute entries, each memory attribute entry specifying access permissions for a corresponding address region of variable size within an address space; in which:

in response to a range checking instruction specifying address identifying parameters for identifying a first address and a second address, the instruction decoder is configured to control the processing circuitry to set, in at least one software-accessible storage location accessible to at least one type of instruction supported by the instruction decoder, a status value indicative of whether the first address and the second address correspond to the same memory attribute entry;

in which the memory attribute checking circuitry is configured to check whether a memory access request issued by the processing circuitry satisfies access permissions specified in a first plurality of memory attribute entries and check whether the memory access request satisfies access permissions specified in a second plurality of memory attribute entries, and in response to the range checking instruction, the instruction decoder is configured to control the processing circuitry to set, in said at least one software-accessible storage location:

a first status value indicative of whether the first address and the second address correspond to the same entry of the first plurality of memory attribute entries; and a second status value indicative of whether the first address and the second address correspond to the same entry of the second plurality of memory attribute entries.

\* \* \* \* \*